US007214261B2

(12) United States Patent
Hoefer et al.

(10) Patent No.: US 7,214,261 B2
(45) Date of Patent: May 8, 2007

(54) FATTY ACID ESTERS BASED ON BRANCHED FATTY ACIDS AND THEIR USE AS PRINTING INK SOLVENTS

(75) Inventors: Rainer Hoefer, Duesseldorf (DE); Matthias Fies, Krefeld (DE); Alfred Westfechtel, Hilden (DE); Shailesh Shah, Dresher, PA (US)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 5 days.

(21) Appl. No.: 10/955,517

(22) Filed: Sep. 30, 2004

(65) Prior Publication Data

US 2005/0103227 A1 May 19, 2005

Related U.S. Application Data

(60) Provisional application No. 60/507,867, filed on Oct. 1, 2003.

(51) Int. Cl.
*C09D 11/00* (2006.01)
(52) U.S. Cl. .................... 106/31.86; 106/31.67
(58) Field of Classification Search ............ 106/31.86, 106/31.67
See application file for complete search history.

(56) References Cited

U.S. PATENT DOCUMENTS

| 4,357,164 A | 11/1982 | Tsuji et al. |
| 5,104,567 A | 4/1992 | Staehr |
| 5,122,188 A | 6/1992 | Erhan et al. |
| 5,173,113 A | 12/1992 | Sugerman et al. |
| 5,178,672 A | 1/1993 | Miller |
| 5,340,493 A | 8/1994 | Principato |
| 5,427,615 A | 6/1995 | Jordan |
| 5,700,541 A * | 12/1997 | Okita et al. ............... 428/841.3 |
| 5,713,990 A | 2/1998 | Erhan et al. |
| 6,176,914 B1 | 1/2001 | Feustel et al. |
| 6,485,812 B1 * | 11/2002 | Sekiguchi ................ 428/32.29 |

FOREIGN PATENT DOCUMENTS

| JP | 3317512 | 6/2002 |
| WO | WO 90/03419 A1 | 4/1990 |
| WO | WO 96/34920 A1 | 11/1996 |

OTHER PUBLICATIONS

Hoefer et al., "Derivate natürlicher Öle als Rohstoffe für Lacke und Druckfarben", Welt Der Farben, No. 5, (1997), pp. 11-18.
Kirk-Othmer, Encyclopedia of Chemical Technology, 3rd Ed., vol. 7, (1979), pp. 770-771.
Tilinski et al., "Experiences With The Use Of DSC In The Determination Of Vapor Pressure Of Organic Compounds", Journal of Thermal Analysis, vol. 35, John Wiley & Sons, Ltd., (1989), pp. 503-513.

* cited by examiner

*Primary Examiner*—J. A. Lorengo
*Assistant Examiner*—Veronica Faison-Gee
(74) *Attorney, Agent, or Firm*—John E. Daniels; Jane E. Alexander

(57) ABSTRACT

Fatty acid esters of which the fatty acid constituents are fatty acids containing a total of 12 to 22 carbon atoms and of which the alcohol constituents are saturated and/or mono- or polyolefinically unsaturated monoalcohols containing a total of 1 to 22 carbon atoms, with the additional proviso that the fatty acid constituents of the esters contain saturated and/or mono- or polyolefinically unsaturated fatty acids and have a branched structure, isostearic acid being excluded as the fatty acid constituent of the esters, are suitable as solvents for printing inks.

22 Claims, No Drawings

FATTY ACID ESTERS BASED ON BRANCHED FATTY ACIDS AND THEIR USE AS PRINTING INK SOLVENTS

CROSS-REFERENCE TO RELATED APPLICATIONS

This application claims benefit of priority, under 35 U.S.C. §119(e), of U.S. Provisional Patent Application No. 60/507,867, filed Oct. 1, 2003, the entire contents of which are herein incorporated by reference.

BACKGROUND OF THE INVENTION

Various printing processes are used to produce various types of printed products and may be divided into three main categories:

letterpress printing
planographic printing (or even offset printing) and
gravure printing.

In letterpress printing, the printing ink is transferred to the substrates from hard raised letters which are covered with a thin layer of ink by rubber rollers. The printing ink has to be formulated in such a way that it dries relatively slowly and does not begin to harden prematurely. Viscous slow-drying printing inks are required for modern high-speed newspaper printing machines using the rotary letterpress process.

In offset printing, the image to be reproduced is fixed on printing plates in the form of zones of opposite polarity. The hydrophobic viscous printing ink only wets the hydrophobic areas of the printing plates.

In gravure printing, the motif is engraved into the printing plate. After the printing plate has been wetted with the relatively low-viscosity printing ink, the surface is stripped so that printing ink is only left in the engraved depressions from which it is then transferred to the substrate to be printed.

The described examples show that printing inks have to meet a large number of requirements. The principal constituents of a printing ink are pigments, binders, solvents and additives with which the required properties of the printing inks are modified. Depending on the application envisaged for the printing ink, its viscosity, flow behavior and tack, for example, can be adjusted in this way.

The various requirements which the physical properties are expected to meet, particularly in the case of large-run printed products, impose stringent demands on the solvent used in the printing ink. On the one hand, it must be able to dissolve or disperse various binders (resins) and various additives; on the other hand, it should enable the viscosity of the printing ink to be adjusted to the required range.

In the past, mineral oils were originally used to a large extent as solvents for printing inks, mainly on cost grounds. This was unsatisfactory for a number of reasons so that there has long been a need to use mineral oil substitutes as solvents for printing inks. For about a decade now, certain fatty acid esters have often been proposed as solvents for printing inks. However, there is still a permanent demand for new developments in this field.

WO-A-90/03419 (Aarhus Oliefabrik) describes the use of $C_{1-5}$ esters of aliphatic $C_{8-22}$ monocarboxylic acids for removing grease, inks and other soils from printing machines.

JP-B2-3,317,512 (Nisshin Oil Mills) describes solvents for planographic and letterpress printing inks which contain as their principal constituent fatty acid monoesters of which the fatty acid component contains 6 to 22 carbon atoms and the alcohol component 1 to 4 carbon atoms.

U.S. Pat. No. 5,104,567 (A/S Alaska Gruppen) describes cleaning fluids for removing printing inks from printing machines, these cleaning fluids containing a vegetable oil and an emulsifier in the form of a surfactant.

WO-A-96/34920 (Henkel KGaA) describes solvent compositions for printing inks. The compositions contain (a) dearomaticized mineral oils, (b) esters of $C_{8-22}$ fatty acids and/or (c) $C_{6-36}$ fatty alcohols.

U.S. Pat. No. 4,357,164 (Sakata Shokai Ltd.) describes printing ink compositions containing high-boiling solvents in combination with esters based on $C_{4-10}$ fatty acids, oleic acid and elaidic acid.

U.S. Pat. No. 5,122,188 (The United States of America) describes printing inks based on heat-treated oils, the heat treatment leading to polymerization products with a molecular weight above 26,000.

U.S. Pat. No. 5,340,493 (R. J. Principato) describes cleaning compositions for removing printing inks from machine parts used in the printing industry. The ternary compositions contain esters of tall oil fatty acids, organic solvents and surfactants.

U.S. Pat. No. 5,178,672 (Canadian Fine Color Company) describes a carrier medium for paste-form printing inks, this carrier medium containing esters based on vegetable fatty acids and simple alcohols or glycols as solvent. The vegetable fatty acids are understood to be those which occur naturally in oils of vegetable origin, i.e. which have not been subjected to further chemical modification. The main representatives of the described class of fatty acids are mentioned in column 2, lines 32–37. They are saturated and olefinically unsaturated linear fatty acids.

U.S. Pat. No. 5,427,615 (Arizona Chemical Comp.) describes a process for the production of a gel-form printing ink composition, a fatty acid ester being used as solvent (step B). The fatty acid constituent of the ester comprises $C_{8-24}$ fatty acids while the alcohol constituent comprises alcohols or glycols containing 1 to 10 carbon atoms, with the proviso that the fatty acid emanates from oils which occur in linseed oil, soybean oil and rapeseed oil.

U.S. Pat. No. 5,173,113 (Topez Comp.) describes printing ink compositions which contain di- or oligoesters of olefinically unsaturated fatty acids and di- or polyfunctional acrylate esters as functional constituents.

U.S. Pat. No. 5,713,990 (The United States of America) describes printing ink compositions based on a ternary mixture: (1) a resin or heat-treated (and hence polymerized) oil, (2) a non-heat-treated vegetable oil and (3) at least one fatty acid ester based on unsaturated fatty acids, more particularly linoleic acid and linolenic acid. Component (3) is present in minor amounts.

SUMMARY OF THE INVENTION

This invention relates to the use of special fatty acid esters based on branched fatty acids as solvents for printing inks.

As the expert is aware, solvents perform various functions in printing inks. First of all, they dissolve or disperse the main components of the printing ink, more especially pigments and binders (resins). At the same time, they guarantee the transport of the printing ink from the reservoir onto the printing rollers and the substrate to be printed. In this connection, the solvents have sometimes also been referred to by experts as carrier media or carrier oils for printing inks, cf. Welt der Farben, No. 5/1997, pages 11–18. Wherever the expression "solvents for printing inks" is used in the present specification in line with common terminology, it is intended to encompass the alternative names.

The present invention relates to the use of fatty acid esters as solvents for printing inks, the fatty acid constituents of the esters being fatty acids containing a total of 12 to 22 carbon atoms and the alcohol constituents of the esters being saturated and/or mono- or polyolefinically unsaturated monoalcohols containing a total of 1 to 22 carbon atoms, with the additional proviso that the fatty acid constituents of the esters contain saturated and/or mono- or polyolefinically unsaturated fatty acids and have a branched structure, isostearic acid being excluded as the fatty acid constituent of the esters.

According to the invention, esters that are liquid at 20° C. are preferred solvents.

DETAILED DESCRIPTION OF THE INVENTION

Fatty Acid Constituents of the Esters

In one embodiment, the fatty acid constituents of the esters are saturated and/or mono- or polyolefinically unsaturated branched fatty acids containing a total of 18 carbon atoms, isostearic acid being excluded as the fatty acid constituent of the esters. In a preferred embodiment, the fatty acid constituents of the esters are mainly methyl-branched. Iso-oleic acid is particularly preferred. Iso-oleic acid is obtainable, for example, by removing stearic acid from the monomer fatty acid formed in the production of dimer fatty acid, as described hereinafter, and then distilling the monomer fatty acid.

Alcohol Constituents of the Esters

Preferred alcohol constituents of the esters are saturated monoalcohols containing a total of 1 to 12 carbon atoms. They may be saturated or unsaturated, linear or branched. Methanol, ethanol, n-propanol, isopropanol, n-butanol, isobutanol and 2-ethylhexanol are most particularly suitable alcohol constituents of the esters.

OTHER EMBODIMENTS

In one embodiment, the esters mentioned based on branched fatty acids are used in combination with
  esters based on linear fatty acids,
  esters based on fatty acids containing alicyclic structural elements and
  esters based on fatty acids containing aromatic structural elements.

According to this embodiment, the present invention also relates to the use of compositions containing
  esters based on linear fatty acids,
  esters based on branched fatty acids,
  esters based on fatty acids containing alicyclic structural elements and
  esters based on fatty acids containing aromatic structural elements as solvents for printing inks.

The compositions mentioned are preferably used in the form of the esters of so-called monomer fatty acids. These are commercially obtainable products, for example Emery® 935 (formerly: Aliphat® 47) of Cognis GmbH & Co. KG. The production of monomer fatty acids is described in the section entitled "monomer fatty acids".

The following observations apply to the above-mentioned components of the composition:
  Esters based on linear fatty acids are understood to be esters of which the fatty acid constituents contain a total of 12 to 22 carbon atoms and of which the alcohol constituents are saturated and/or mono- or polyolefinically unsaturated monoalcohols containing a total of 1 to 22 carbon atoms, with the additional proviso that the fatty acid constituents of the esters are linear and aliphatic. Within this class of compounds, stearic acid esters are particularly preferred.

Esters based on branched fatty acids are understood to be esters of which the fatty acid constituents are fatty acids containing a total of 12 to 22 carbon atoms and of which the alcohol constituents are saturated and/or mono- or polyolefinically unsaturated monoalcohols containing a total of 1 to 22 carbon atoms, with the additional proviso that the fatty acid constituents of the esters are saturated and/or mono- or polyolefinically unsaturated fatty acids and have a branched structure. Iso-oleic acid is preferred as the fatty acid constituent.

Esters based on fatty acids containing alicyclic structural elements are understood to be esters of which the fatty acid constituents contain a total of 12 to 22 carbon atoms and of which the alcohol constituents are saturated and/or mono- or polyolefinically unsaturated monoalcohols containing a total of 1 to 22 carbon atoms, with the additional proviso that the fatty acid constituents of the esters contain an alicyclic group, preferably a cyclohexyl group, which may optionally be substituted by an aliphatic group. If the alicyclic group is substituted, the substituent is preferably an alkyl substituent, more particularly a saturated, linear or branched alkyl group containing a total of 1 to 8 carbon atoms.

Esters based on fatty acids containing aromatic structural elements are understood to be esters of which the fatty acid constituents are saturated and/or mono- or polyolefinically unsaturated fatty acids containing a total of 12 to 22 carbon atoms and of which the alcohol constituents are saturated and/or mono- or polyolefinically unsaturated monoalcohols containing a total of 1 to 22 carbon atoms, with the additional proviso that the fatty acid constituents of the esters contain an aryl group which may optionally be substituted by an aliphatic group. The aryl group (as a substituent) may basically be positioned anywhere in the fatty acid chain. The aryl group is preferably a phenyl group. If the aryl group is substituted, the substituent is preferably an alkyl substituent, more particularly a saturated, linear or branched alkyl group containing a total of 1 to 8 carbon atoms.

Monomer Fatty Acid

As the expert is aware, dimer fatty acids are carboxylic acids obtainable by oligomerization of unsaturated carboxylic acids, generally fatty acids, such as oleic acid, linoleic acid, erucic acid and the like. The oligomerization is normally carried out at elevated temperature in the presence of a catalyst, for example of clay. The substances obtained—technical-quality dimer fatty acids—are mixtures in which the dimerization products predominate. However, the mixtures also contain small amounts of monomers (the sum total of monomers in the crude mixture of the dimer fatty acids is referred to by the expert as monomer fatty acids) and higher oligomers, more especially the so-called trimer fatty acids. Dimer fatty acids are commercially available products and are available in various compositions and qualities (for example under the name of Empol®, a product of the applicant).

As already mentioned, the monomeric compounds present in the mixture for the production of dimer fatty acids after the reaction has been carried out and obtainable therefrom by distillation-based processes are normally referred to by the expert as monomer fatty acids. In this connection, it is pointed out that the expression "monomer fatty acids" is known to the expert, cf. for example the paragraph bridging pages 770 and 771 in the chapter "Dimer Acids" of the reference book Kirk-Othmer, Encyclopedia of Chemical Technology, 3rd Edition, Vol. 7 (1979).

The monomer fatty acids are not unreacted starting material of the process for producing dimer fatty acids, but rather products of a secondary reaction containing small amounts of unreacted starting material. The secondary reaction leads to a structural modification of the fatty acids used.

The composition of the monomer fatty acids is subject to certain variations in regard to the nature of the starting materials used in the production of the dimer fatty acids. For example, the content of compounds containing aromatic structural elements in the monomer fatty acids is particularly pronounced when linoleic acid is predominantly used as starting material.

Esters based on monomer fatty acids obtainable in the production of dimer fatty acids using either oleic acid or linoleic acid or a mixture of oleic and linoleic acid (for example in the form of the so-called tall oil fatty acids) as starting material are particularly preferred for the purposes of the present invention.

EXAMPLES

Test Methods

Kauri-butanol Value:

The so-called kauri-butanol value is often used by the expert to determine the dissolving power of printing ink resins. The kauri-butanol value characterizes the dissolving capacity of liquid solvents. The principle of the method is to titrate a certain amount of a saturated solution of kauri gum in n-butanol with the solvent to be tested until distinct clouding occurs. The quantity of solvent used in ml is the kauri-butanol value. Typical kauri-butanol values are:
- ca. 20 for dearomaticized mineral oils,
- ca. 50 for mineral oils containing ca. 50% aromatic constituents 105 for toluene.

For the purposes of the present invention, the measurement of the kauri-butanol values was carried out to ASTM D 1133.

Resin Solution Viscosity:

Another method for evaluating dissolving power is to determine the viscosity of resin solutions. To this end, 50% by weight solutions of Sylvaprint MP® 6348 (a resin product of Arizona Chemicals) in the monomer fatty acid esters of Examples 1 to 4 were prepared and measured for viscosity (Brookfield, 25° C., spindle 1, 2 r.p.m.). The measured value is shown as the "resin solution viscosity" in the characteristic data of the products of Examples 1 to 4.

DSC Boiling Temperature:

Evaporation behavior is also of interest. The boiling temperature of the esters of Examples 1 to 4 was determined by differential scanning calorimetry (cf. D. Tilinsky, H. Puderbach: "Experiences with the Use of DSC in the Determination of Vapor Pressure of Organic Compounds" in J. Thermal Analysis 35 (1989), pp. 503–513).

TGA Value:

Besides the above-mentioned determination of the DSC boiling temperature, thermogravimetry also provides information on evaporation behavior. (Isothermal) thermogravimetry is a method in which the reduction in weight by evaporation of a solvent to be tested is measured as a function of time. For measurement of the TGA values, a certain amount of a monomer fatty acid ester (25 mg) according to Examples 1 to 4 was weighed into an open vessel (=100%) and kept at a temperature of 150° C. (air atmosphere at 3 l/h). After 60, 120 and 180 minutes, the vessel was weighed to determine how much substance was still present. This quantity was expressed in % of the substance originally weighed in.

Tack:

Tack was measured with a Tack-o-scope at 400 m/min at 23° C.

Misting:

Misting was carried out with a Tack-o-scope (2.6 ml; 26° C.; 500 m/min; 3 mins.). Evaluation was visual.

Color Density:

Color density was measured with an x-Rite at 1.5 g/m$^2$.

Gloss:

Gloss was determined with a Byk-Gardner Trigloss on white contrast paper (Erichsen test cards) at 1.5 g/m$^2$ and 60° C.

Setting Speed:

The setting speed was visually determined.

Preparation of the Monomer Fatty Acid Esters

EXAMPLE 1

Monomer Fatty Acid-2-ethylhexyl Ester

Apparatus:

2-liter stirred reactor, water separator, nitrogen stream

Method:

438 g (1.5 mol) monomer fatty acid (Aliphat®34 R; MW=292.2; acid value=192) and 234 g (1.8 mol) alcohol (2-ethylhexanol; MW=130) were introduced into the reactor and heated to 240° C. 0.32 g catalyst (tin-II oxide) was added during the heating phase at 180° C. The temperature of the dephlegmator was ca. 110–120° C. When an acid value below 10 had been reached, vacuum was applied and the reactor was brought in stages to 500 mbar over a period of about 3 hours. Stirring was continued until the low acid value required was reached. The excess alcohol used was distilled off at about 50 mbar until the 2-ethylhexanol content in the product was below 0.1%. The monomer fatty acid ester was distilled off. It was then dried in vacuo at 120° C. The mixture was then left to cool to around 50° C. and filtered using a filter aid.

The product had the following characteristics:

acid value=0.4
saponification value=137
hydroxyl value=0.2
iodine value=53
Brookfield viscosity at 25° C., spindle 4, 50 r.p.m.: 15.0 mPas
kauri-butanol value=41
resin solution viscosity=>1,000,000 mPas
DSC boiling point=sample decomposed at 300° C.
TGA values: 91 (after 60 mins.); 82 (after 120 mins.); 74 (after 180 mins.)

EXAMPLE 2

Monomer Fatty Acid Isobutyl Ester

Apparatus:

2-liter stirred reactor, water separator, nitrogen stream

Method:

438 g (1.5 mol) monomer fatty acid (Aliphat® 34 R; MW=292.2; acid value=192) and 0.26 g catalyst (Fascat® 2001; a product of Unichema) were heated to 240° C. 122 g (1.8 mol) alcohol (i-butanol) were then added dropwise over a period of 5 hours, steps being taken to ensure that the temperature never fell below 220° C. At the end of this period, the acid value was 5. After stirring for another hour at 240° C., the acid value had fallen to 3.5. The mixture was then stirred for another 3.5 hours at 240° C., the acid value falling to 1.8. The mixture was then distilled under the following conditions: fraction 1 was obtained at a bottom temperature of 151–165° C., a vapor temperature of 85–148° C. and a pressure of 0.5–0.3 mbar, yield 31 g. Fraction 2 (main fraction) was obtained at a bottom temperature of 165–175° C., a vapor temperature of 148–160° C. and a pressure of 0.3 mbar, yield 412 g. Fraction 2 was almost water-clear in color. A residue of 51 g was left.

The product (main fraction) had the following characteristics:

acid value=1.0
saponification value=158
hydroxyl value=0.3
iodine value=59
Brookfield viscosity at 25° C., spindle 4, 100 r.p.m.: 10.2 mPas
kauri-butanol value=50
resin solution viscosity=930,000 mPas
DSC boiling point=350° C.
TGA values: 49 (after 60 mins.); 21 (after 120 mins.); 14 (after 180 mins.)

EXAMPLE 3

Monomer Fatty Acid Isopropyl Ester

Apparatus:

2-liter stirred reactor, water separator, nitrogen stream

Method:

438 g (1.5 mol) monomer fatty acid (Aliphat® 34 R; MW=292.2; acid value=192) and 0.26 g catalyst (Fascat® 2001) were heated to 240° C. 112 g (1.8 mol) alcohol (isopropanol) were then added dropwise over a period of 5 hours, steps being taken to ensure that the temperature never fell below 220° C. At the end of this period, the acid value was 5. The mixture was then stirred for 5 hours at 240° C. and for another 3.5 hours at 250° C. Finally, the reaction mixture was distilled as in Example 2. The required product (main fraction) was again almost water-clear in color.

The product had the following characteristics:
acid value=9.5
saponification value=163
hydroxyl value=15.9
iodine value=66
Brookfield viscosity at 25° C., spindle 4, 50 r.p.m.: 9.6 mPas
kauri-butanol value=61
resin solution viscosity=644,000 mPas
DSC boiling point=370° C.
TGA values: 76 (after 60 mins.); 58 (after 120 mins.); 44 (after 180 mins.)

EXAMPLE 4

Monomer Fatty Acid Methyl Ester 100 kg (312 mol) monomer fatty acid (Emery® 935, a product of Cognis Corp./USA; acid value=175) were melted and heated under nitrogen with 11.7 kg (127 mol) glycerol and 33.5 g catalyst (Fascat® 2001). The water of reaction formed was distilled off at 180 to 240° C. When the acid value of the mixture had fallen below 10, the mixture was heated in a water jet vacuum at 200° C. until the acid value was below 1. 12 kg (375 mol) methanol and 2 kg of a 30% by weight solution of sodium methanolate in methanol were added to the glyceride thus prepared, followed by stirring under nitrogen for 2 hours at 70° C. The mixture was then left standing for about 30 minutes for phase separation, after which the glycerol phase was removed. For "post-esterification", the mixture was stirred for 1 hour at 70° C. after the addition of 1.8 kg (56 mmol) methanol. 0.35 kg of an 85% by weight aqueous solution of phosphoric acid was then added and excess methanol was distilled off in vacuo. To remove residual glycerol and salts, the mixture was stirred for about 15 minutes with about 100 kg hot water, left to settle for about 30 minutes and the aqueous phase was removed. Washing was then repeated in the same way. The product was then dried in a jet vacuum and subsequently distilled. A first fraction of 2% was obtained at 1 mbar and a bottom temperature of up to 180° C., the required methyl ester distilling over as the main fraction at a temperature of up to 200° C. 88 kg of a light yellow clear product were obtained.

The product had the following characteristic data:
acid value=0.9
saponification value=182
hydroxyl value=0.5
iodine value=71
Brookfield viscosity at 25° C., spindle 4, 100 r.p.m.: 8.4 mPas
kauri-butanol value=66
resin solution viscosity=340,000 mPas
DSC boiling point=sample decomposed at 300° C.
TGA values: 52 (after 60 mins.); 16 (after 120 mins.); 4 (after 180 mins.)

Formulations

Varnish:

38 g Setaprint P 7000 (Akzo Resins), 10 g Setalin V 405 (Akzo Resins) and 52 g of the monomer fatty acid ester of Example 3 were combined and then thoroughly mixed.

The mixture had the following characteristics:
Brookfield viscosity at 23° C./10 s$^{-1}$: 62 Pa·s
Brookfield viscosity at 23° C./50 s$^{-1}$: 46 Pa·s
tack (400 m/min. at 23° C.)=8.0

Pigment Concentrate:

76 g of the above-described varnish were combined with 24 g Permanent Yellow GRX 82 (Hoechst) and thoroughly mixed.

Offset Printing Ink:

50 g of the above-described pigment concentrate was combined with 47 g of the above-described varnish and 3 g of the monomer fatty acid ester of Example 3 and thoroughly mixed. Accordingly, 100 g of the offset ink thus prepared contained 12 g Permanent Yellow GRX 82
32.3 g Setaprint P 7000
8.5 g Setalin V 405
47.2 g monomer fatty acid ester of Example 3.

This printing ink had the following features:
Brookfield viscosity at 23° C./10 s$^{-1}$: 140 Pa·s
Brookfield viscosity at 23° C./50 s$^{-1}$: 90 Pa·s
tack (400 m/min. at 23° C.)=9.3
flow=good
misting (2.6 ml; 26° C.; 500 m/min.; 3 mins.)=very slight
density (at 1.5 g.m$^1$)=1.77
gloss (at 1.5 g/m$^2$ and 60° C.)=82
setting speed=fast It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A printing ink composition comprising:
   (a) at least one component selected from the group consisting of pigments and binders; and
   (b) a solvent comprising: (1) an ester based on linear aliphatic fatty acid; (2) an ester based on branched saturated and/or mono- or polyolefinically unsaturated fatty acids; (3) an ester based on branched fatty acids containing an alicyclic group; and (4) an ester based on branched fatty acids containing an aryl group, wherein the fatty acid constituents of esters (1), (2), (3), and (4) each contain a total of 12 to 22 carbon atoms and wherein the alcohol constituents are saturated and/or mono- or polyolefinically unsaturated monoalcohols each containing a total of 1 to 22 carbon atoms.

2. The composition according to claim 1, wherein the alicyclic group is substituted by an aliphatic group.

3. The composition according to claim 1, wherein the aryl group is substituted by an aliphatic group.

4. The composition according dto claim 1, wherein the fatty acid of components (1) to (4) are monomer fatty acids.

5. A method comprising:
   (a) providing at least one component selected from the group consisting of pigments and binders; and
   (b) mixing the at least one component with a solvent comprising: (1) an ester based on linear aliphatic fatty acids; (2) an ester based on branched saturated and/or mono- or polyolefinically unsaturated fatty acids; (3) an ester based on branched fatty acids containing an alicyclic group; and (4) an ester based on branched fatty acids containing an aryl group, wherein the fatty acid constituents of esters (1), (2), (3), and (4) each contain a total of 12 to 22 carbon atoms and wherein the alcohol constituents are saturated and/or mono- or polyolefinically unsaturated monoalcohols each containing a total of 1 to 22 carbon atoms.

6. The method according to claim 5, wherein the alicyclic group is substituted by an aliphatic group.

7. The method according to claim 5, wherein the aryl group is subtituted by an aliphatic group.

8. The method according to claim 5, wherein the fatty acids of components (1) to (4) are monomer fatty acids.

9. The composition according to claim 1, wherein the branched fatty acid has 18 carbon atoms.

10. The composition according to claim 1, wherein the branched fatty acid is methyl-branched.

11. The composition according to claim 1, wherein the branched fatty acid is saturated.

12. The composition according to claim 1, wherein the branched fatty acid has at least one olefinic unsaturation.

13. The composition according to claim 1, wherein the fatty acid is iso-oleic acid.

14. The composition according to claim 1, wherein at least one of the alocohol constituents is a saturated monoalcohol having from 1 to 22 carbon atoms.

15. The composition according to claim 1, wherein at least one of the alcohol constituents is selected from the group consisting of methanol, ethanol, n-propanol, isopropanol, n-butanol, isobutanol, 2-ethylhexanol, and mixtures thereof.

16. The composition according to claim 5, wherein the branched fatty acid has 18 carbon atoms.

17. The composition according to claim 5, wherein the branched fatty acid is methyl-branched.

18. The composition according to claim 5, wherein the branched fatty acid is saturated.

19. The composition according to claim 5, wherein the branched fatty acid has at least one olefinic unsaturation.

20. The composition according to claim 5, wherein the fatty acid is iso-oleic acid.

21. The composition according to claim 5, wherein at least one of the alocohol constituents is a saturated monoalcohol having from 1 to 22 carbon atoms.

22. The composition according to claim 5, wherein at least one of the alcohol constituents is selected from the group consisting of methanol, ethanol, n-propanol, isopropanol, n-butanol, isobutanol, 2-ethylhexanol, and mixtures thereof.

* * * * *